United States Patent [19]

Vandervier et al.

[11] Patent Number: 4,803,483
[45] Date of Patent: Feb. 7, 1989

[54] DOWNHOLE PRESSURE AND TEMPERATURE MONITORING SYSTEM

[75] Inventors: Joseph E. Vandervier, Claremore; Clinton A. Boyd, Tulsa, both of Okla.

[73] Assignee: Hughes Tool Company, Houston, Tex.

[21] Appl. No.: 74,389

[22] Filed: Jul. 16, 1987

[51] Int. Cl.⁴ .............................................. G01V 1/42
[52] U.S. Cl. ................................. 340/856; 340/857; 367/81
[58] Field of Search ............... 340/853, 856, 857, 858, 340/859; 166/64, 66, 66.4; 175/40, 48; 280/83 P, 81.4, 81.5; 367/81

[56] References Cited

U.S. PATENT DOCUMENTS

| | | | |
|---|---|---|---|
| 2,412,575 | 12/1946 | Frosch | 250/83.6 |
| 2,973,505 | 2/1961 | Johannesen | 340/18 |
| 3,019,414 | 1/1962 | Peterson | 340/18 |
| 3,238,487 | 3/1966 | LeVan et al. | 338/41 |
| 3,284,669 | 11/1966 | Boyd | 340/853 |
| 3,394,643 | 7/1968 | Bruce et al. | 340/206 |
| 3,412,391 | 11/1968 | Ward | 340/282 |
| 3,445,801 | 5/1969 | Sattler | 338/42 |
| 3,525,262 | 9/1970 | Goran | 73/398 |
| 3,991,611 | 11/1976 | Marshall et al. | 73/151 |
| 4,157,535 | 6/1959 | Balkanli | 340/18 |
| 4,178,579 | 12/1979 | McGibbeny et al. | 340/856 |
| 4,464,660 | 8/1984 | Ginn | 340/870.38 |
| 4,532,389 | 7/1985 | Woods | 200/83 P |
| 4,620,073 | 10/1986 | Yokota et al. | 200/83 P |
| 4,631,535 | 12/1986 | Butlin | 340/856 |
| 4,631,536 | 12/1986 | Ward | 340/857 |

*Primary Examiner*—Brian S. Steinberger
*Attorney, Agent, or Firm*—James E. Bradley

[57] ABSTRACT

An apparatus and method for monitoring the temperature and pressure in a well bore is used in connection with a submersible pump disposed in the well bore and electrically energized by a power conductor suspended in the well bore. A plurality of resistors and a plurality of pressure sensitive switches are disposed in the well bore along with a temperature sensitive circuit element. A constant current source at the surface provides a dc sensing signal that is superimposed on the power cable. A single voltage reading taken at the surface provides a measure of both temperature and pressure in the well bore.

7 Claims, 2 Drawing Sheets

DOWNHOLE PRESSURE AND TEMPERATURE MONITORING SYSTEM

BACKGROUND OF THE INVENTION

1. Field of the Invention:

This invention relates generally to a pressure and temperature monitoring method and apparatus for use in a well bore, and specifically to a temperature and pressure monitoring apparatus for use with a submersible pump in a well bore.

2. Description of the Prior Art:

Pressure monitoring systems have been used for many years and are covered by patents such as: U.S. Pat. Nos. 3,284,669; 3,340,500; and 3,587,076. These systems utilize a bourdon tube transducer whose tube element operates the wiper arm of a potentiometer. These transducers have continuously provided poor long term reliability due to the effects of vibration forces, lack of ruggedness and the tendency of the wiper arm to stick or the potentiometer to open up.

SUMMARY OF THE INVENTION

The present invention is a novel method and apparatus for monitoring the pressure and temperature in a well bore through the use of a single unipolar DC signal which is superimposed on the AC power cable that supplies electrical power to a submersible pump in the well bore.

Pressure information is measured in incremental form by the use of a resistive network which is electrically connected to a plurality of pressure actuated switches. Each switch is connected in parallel to a resistor in the resistive network, and is sensitive to a distinct pressure threshold. As the well bore pressure increases or decreases, resistors are added to, or subtracted from, the resistive network by operation of the pressure switches.

Well bore temperature data is provided by the use of a temperature sensitive circuit element which is electrically connected to the resistive network. This element provides a resistance that varies with temperature. The temperature sensing element can be selected so that the total downhole resistance change across the expected temperature operating conditions will not be greater that the incremental resistance change caused by a pressure switch operating.

The resistive network and the temperature sensitive circuit element are electrically isolated from alternating currents; however, DC currents are allowed to flow through the resistive network and the temperature sensitive circuit element. A constant current source, located at the surface, provides a DC sensing signal via the power cable suspended in the well bore.

This system contains an additional feature. The resistive network and the temperature sensitive circuit element are electrically isolated from DC currents having a direction of flow opposite that of the sensing current. Thus, a high voltage can be applied to the insulated power conductor to provide a current flowing in a direction opposite that of the sensing current to test the integrity of the insulation without damaging the resistive network and the temperature sensitive circuit element.

The above as well as additional objects, features, and advantages of the invention will become apparent in the following detailed description.

DESCRIPTION OF THE PREFERRED EMBODIMENT

Figure 1:
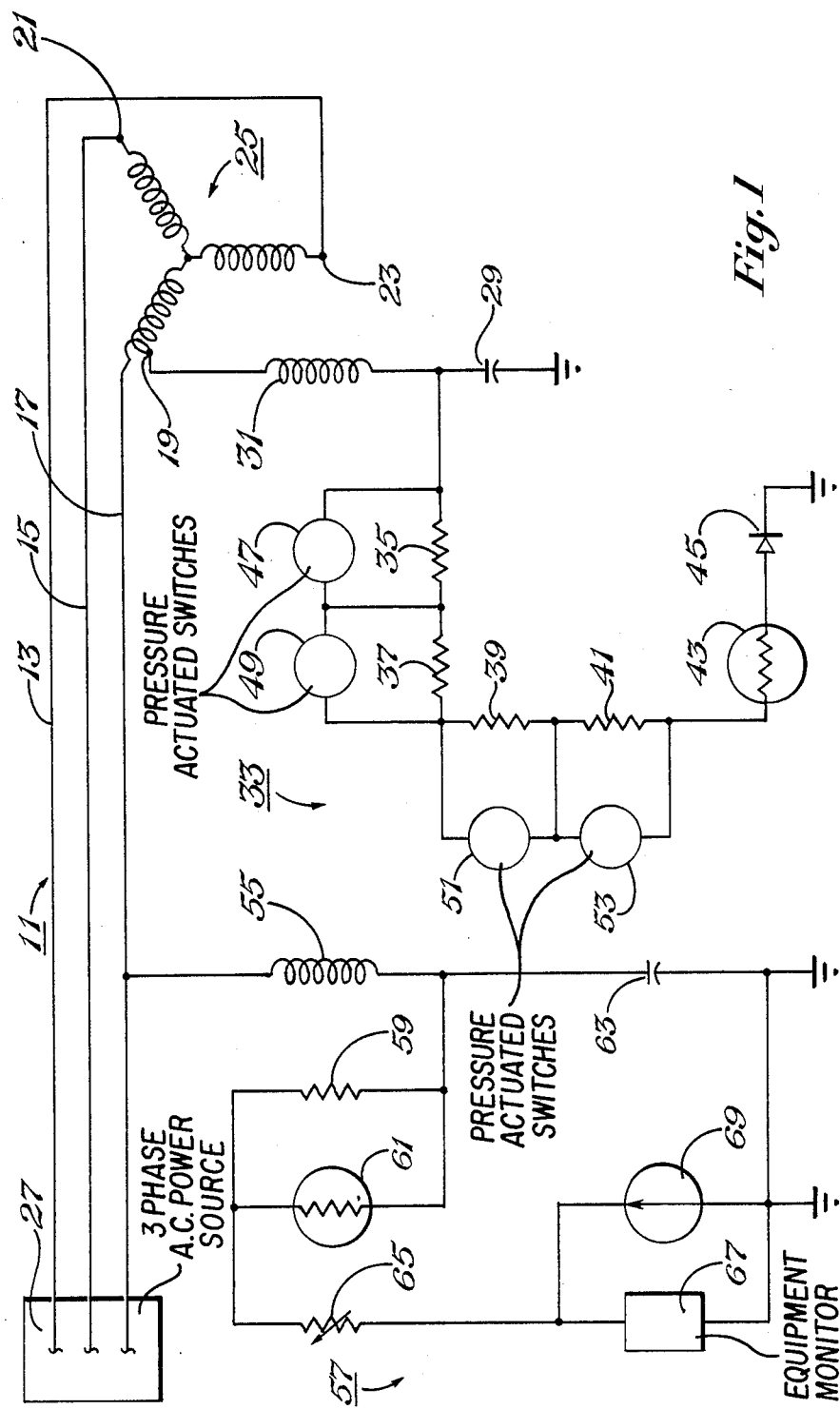
FIG. 1 is a schematic diagram of a downhole pressure and temperature monitoring apparatus constructed in accordance with this invention.

Referring to FIG. 1, insulated power conductor 11 is suspended in the well bore and is composed of three separate insulated conductors 13, 15, and 17. Each conductor 13, 15, and 17 is connected to a terminal of the submersible pump motor 25. Conductor 13 is connected to terminal 23 of submersible pump motor 25. Conductor 15 is electrically connected to terminal 21 of submersible pump motor 25. Conductor 17 is electrically connected to terminal 19 of submersible pump motor 25. Three phase alternating current (AC) is provided from AC power source 27 at the surface through the insulated power conductor 11 to submersible pump motor 25.

Inductor 31 electrically connects the motor windings of the submersible pump motor 25 to the well bore pressure and termperature monitoring circuitry 33. More specifically, inductor 31 is connected between motor windings of submersible pump motor 25 and an impedance network comprising a plurality of series connected resistors 35, 37, 39, and 41. Inductor 31 is also connected to gorund through shunting capacitor 29. Inductor 31 serves as filter means for blocking AC power from circuitry 33 and passing direct current (DC).

The free terminal of resistor 41 is connected to temperature sensitive circuit element 43. This circuit element 43 is in turn connected to the p-side of diode 45. The n-side of diode 45 is connected to ground. The diode 45 has a linear voltage drop with temperature.

Temperature sensitive circuit element 43 is a solid state linear temperature device that is used to provide an electrical resistance that varies with the ambient temperature in the well bore. In the preferred embodiment, this temperature sensitive circuit element 43 is a positive coefficient resistance device having linear characteristics.

A plurality of pressure actuated switches are connected in parallel with resistors 35, 37, 39, and 41. These resistors 35, 37, 39 have very low temperature coefficients so that their values change very little with temperature change in the well bore. Pressure switch 47 is connected in parallel with resistor 35. Pressure switch 49 is connected in parallel with resistor 37. Pressure switch 51 is connected in parallel with resistor 39. Pressure switch 53 is connected in parallel with resistor 41.

Pressure actuated switches 47, 49, 51 and 53 are connected in parallel to the resistors 35, 37, 39, and 41 respectively. In the preferred embodiment, these pressure switches are "KLIXON" brand pressure switches manufactured by Texas Instruments. The switches are hermetically sealed, and corrosion resistant. Each pressure actuated switch has a distinct pressure threshold.

In the preferred embodiment, pressure actuated switch 47 is ordinarily closed, providing a short circuit path around resistor 35; but opens at or above 500 pounds per square inch of pressure, providing an open circuit instead of a short circuit.

Pressure actuated switch 49 is normally closed providing a short circuit path around resistor 37; but opens at or above 250 pounds per square inch pressure. Pressure actuated switch 51 is normally closed, providing a short circuit path around resistor 39. This switch will open at or above 100 pounds per square inch pressure and provide an open circuit about resistor 39. Pressure actuated switch 53 is normally closed, provding a short circuit path around resistor 41. This switch will open at or above 50 pounds per square inch pressure and provide an open circuit around resistor 41.

The surface electronics will now be described. Inductor 55 electrically connects conductor 17 of insulated power conductor 11 to the surface electronics 57. One terminal of inductor 55 is electrically connected to power conductor 17. The opposite terminal of inductor 55 is connected to the parallel combination of resistor 59 and thermistor 61. The second terminal of inductor 55 is also connected to ground through shunting compacitor 63.

Trim resistor 65 electrically connects the parallel combination of resistor 59 and thermistor 61 to monitoring equipment 67. The opposite terminal of monitoring equipment 67 is connected to ground. Constant current source 69 is connected in parallel with monitoring equipment 67. Monitoring equipment 67 is of conventional components for determining the voltage of the constant current source 69 and providing a readout indicating pressure level and temperature.

In operation, the surface electronics 57 are electrically isolated from the AC power signals generated by AC power source 27 by operation of inductor 55 and capacitor 63. Likewise, the well bore circuitry 33 is electrically isolated from the AC power signal by operation of inductor 31 and capacitor 29.

Inductors 55 and 31 and capacitors 29 and 63 operate to provide an open circuit to AC signals and a short circuit to DC signals. The constant current source 69 provides a unipolar DC current of constant magnitude. In the preferred embodiment, this current has a magnitude of approximately 1 milliamp. This current is passed through the inductor 55 and is superimposed upon the insulated power conductor 11 and transmitted down the well bore along with the AC power provided by AC power source 27.

In the well bore, the DC current will flwo through inductor 31 to the well bore circuitry 33. Any low frequency AC signal that passes through inductors 31 is shunted to ground by capacitor 29. Capacitor 29 is an open circuit to the DC current. Thus, if all of the pressure switches 47, 49, 51, and 53 are actuated, the DC current is routed through series connected resistors 35, 37, 39, 41 and temperature sensitive circuit element 43, and finally through diode 45 to ground.

In the preferred embodiment, the resistance of both inductor 31 and inductor 55 are linear over a wide range of temperatures. It is desirable to measure resistance changes that are a result of temperature and pressure changes downhole. Since the surface inductor 55 resistance will vary with surface ambient temperature, it is desirable to provide some temperature compensation in view of the wide range of temperatures that one expects to find in the oil field. Accordingly, thermistor 61 and resistor 59 are provided to achieve temperature stability for the surface electronics 57. The combination of thermistor 61 and resistor 59 is selected to have a change in resistance with temperature that is approximately the same in magnitude as the inductor 55, but opposite in direction. As the resistance of inductor 55 increases with temperature change, the combined resistance of thermistor 61 decreases and resistor 59 decreases proportionately.

The flow of the DC current through resistors 35, 37, 39, 41 and temperature sensitive circuit element 43 will produce a voltage drop. This voltage drop can be measured at the surface by monitoring equipment 67. Since the current source is a constant current source, the voltage drop produced by its flow will be directly proportional to the electrical resistance encountered by the current. Thus, the voltage measurements provided by the monitoring equipment will correspond directly to the impedance or resistance of the well bore circuitry 33. The power cable 11 and the motor 25 have negligible resistance compared to the resistance of the resistive network and temperature sensitive circuit element.

Note that at pressure levels lower than 50 psi (pounds per square inch), resistors 35, 37, 39, and 41 of the resistive network are short circuited because all of the pressure switches 47, 49, 51, and 53 will be open. Thus, the DC current will experience no resistance from the circuit elements, but only the resistance of the temperature sensitive circuit element 43 and the diode 45.

Figure 2:
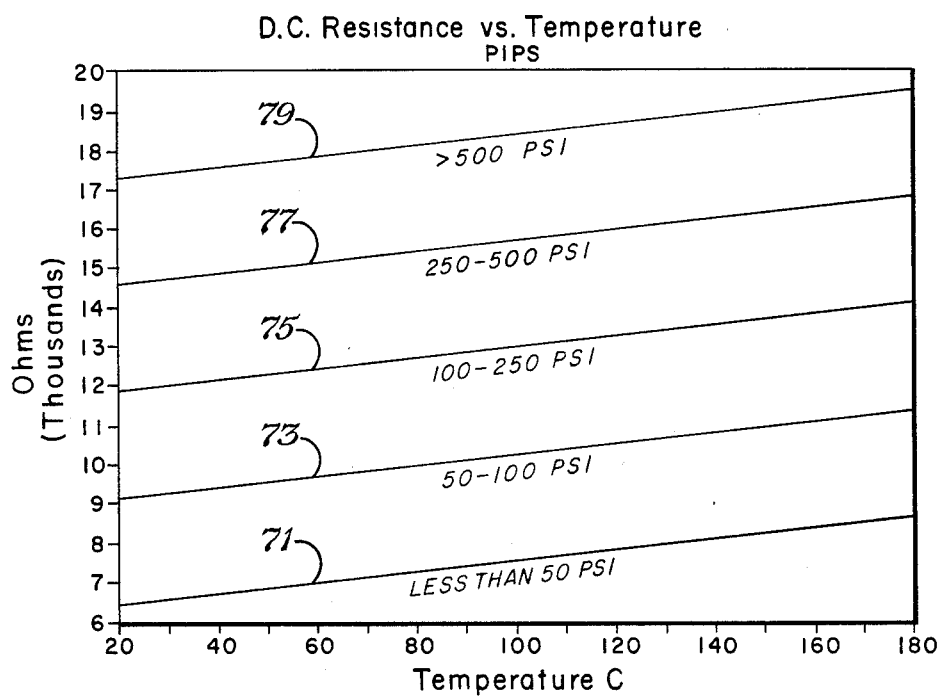
FIG. 2 is a graphical presentation of the relationship between the DC resistance of the downhole pressure and temperature monitoring apparatus versus the well bore pressure and temperature.

Referring to FIG. 2, line 71 shows that when the voltage measured at the monitoring equipment 67 indicates a resistance in the range between about 6500 ohms and 8600 ohms, this will indicate that the pressure is less than 50 psi. The precise reading indicates the temperature. For example, about 7300 ohms indicates a temperature of 80 degrees C.

As the pressure level increases above 50 psi but below 100 psi, the DC current will experience resistance only from resistor 41 and temperature sensitive circuit element 43. Pressure switch 53 will open above 50 psi, causing the current to flow through resistor 41 and element 43.

Referring to FIG. 2, line 73 shows that if the voltage measured by monitoring equipment 67 indicates a resistance in the range from about 9200 ohms to 11,400 ohms, then it will provide a readout indicating pressure in the range from 50 to 100 psi. The precise reading, for example, about 10,000 ohms, indicates the temperature, which in this example would again be about 80 degrees C.

Note that between the upper limit of line 71, about 8600 ohms, and the lower limit of line 73, about 9200 ohms, there is a difference of about 600 ohms. The monitoring equipment 67 will under no circumstances measure any resistance in this gap of 600 ohms. The gap allows the monitoring equipment 67 to determine whether it is measuring resistance on line 71 or on line 73. In other words, for each pressure, temperature reading, there exists a unique resistance value.

At pressure levels above 100 psi but below 250 psi, the DC current will experience resistance from resistors 39, 41, and the temperature sensitive circuit element 43 and diode 45. Pressure switch 51 will change state to provide an open circuit around resistor 39. Line 75 in FIG. 2 shows that the resistance measured at the surface will be approximately in the range from 11,900 to 14,100 ohms. The actual resistance in this range indicates the temperature.

At pressure levels above 250 psi but below 500 psi, the DC current will experience resistance from resistor 37, 39, 41 and temperature sensitive circuit element 43 and diode 45. The pressure switch 49 will change state to provide an open circuit around the resistor 37. Line 77 in FIG. 2 shows that the resistance measured at the surface will be in the range from about 14,600 to 16,100 ohms. The precise resistance indicates the actual temperature.

At pressure levels above 500 psi, the DC current will experience resistance from all the resistors, 35, 37, 39, 41 and temperature sensitive circuit element 43 and diode 45. All of the pressure switches 47, 49, 51, and 53 are open at this level. The resistance measured will be about from 17,300 to 19,500 ohms.

Each resistor in the network is of equal resistive value. It is important that the temperature sensing element 43 never produce a resistance equal to or greater than this value. In the preferred embodiment, resistors 35, 37, 39, and 41 each have a value of 2700 ohms. To avoid having a false pressure reading, the temperature sensing element must be selected so that the total downhole resistance change over the expected ambient temperature range will not be greater than the incremental resistance change caused by the operation of a pressure switch. If this design criteria is observed, a single voltage reading can provide both temperature and pressure data. The preferred range for the resistance of the temperature sensing element 43 for the full temperature range is about 2150 ohms.

Often, it is desirable to test the integrity of the insulation of the power conductor. Returning to FIG. 1, it will be explained how this is accomplished in the preferred embodiment.

Diode 45 is a high voltage diode that blocks the flow of current that is opposite in direction to the sensing signal provided by the constant current source 69. This allows the operator to test the integrity of the insulated power conductor 11 and the submersible pump motor 25.

A meggar can be employed to test the dielectric condition of both. Since the meggar is usually a 500 volt DC device, the well bore circuitry 33 must be protected from such high voltages. Accordingly, diode 45 is provided.

The meggar can be used with the opposite polarity of the surface sensing package, and the blocking diode will prevent the passage of current through the well bore circuitry 33. Any current flow as a result of the meggar wil be through the insulation system. Accordingly, the dielectric condition of the insulated power conductor 11 and the submersible pump motor 25 can be tested without the necessity of disconnecting the well bore circuitry 33 from the insulated power conductor 11.

This invention presents many advantages over the prior art. The bourdon tube transducer which has been troublesome in the prior art has been eliminated altogether in this design. A single sensing signal can be used to simultaneously retrieve well bore pressure and temperature data. The electrical components comprising this well bore pressure and temperature measurement system are very simple, rugged, and durable. Consequently, breakdowns and malfunctions should be negligible. This apparatus need not be disconnected from the power cable when the operator desires to test the electrical integrity of the insulation on the power cables.

While the invention has been described in only one of its forms, it should be apparent to those skilled in the art that it is not so limited, but is susceptible to various changes and modifications without departing from the scope of the invention.

We claim:

1. In a submersible pump assembly of the type having an insulated power cable suspended in a well bore, providing AC power from the surface to an electrical motor in the well bore, an apparatus for monitoring the pressure in the well bore, comprising:

source means located at the surface electrically connected to the power cable for superimposing a sensing signal on the power cable;

an electrical network means located in the well bore electrically connected to the power cable for providing an electrical response to the sensing signal;

a plurality of pressure actuated switch means, each switch means for switching from a first condition to a second condition when pressure in the well bore reaches a selected level, the selected level for each switch means differing from the other switch means;

means for connecting each pressure actuated switch means into the electrical network means and for altering the electrical response of the electrical network means when each pressure actuated switch means switches between said first condition and said second condition; and means at the surface for monitoring the sensing signal to determine the electrical response of the electrical network means and thus determine which of the pressure actuated switch means has switched between said first condition and said second condition, for providing an indication of the well bore pressure level.

2. In a submersible pump assembly of the type having an insulated power cable suspended in a well bore, providing AC power from the surface to an electrical motor in the well bore, an apparatus for monitoring the pressure and temperature in the well bore, comprising:

source means located at the surface and electrically connected to the power cable for superimposing a sensing signal on the power cable;

an electrical network located in the well bore electrically connected to the power cable for providing a first electrical response to the sensing signal;

temperature sensitive circuit means electrically connected to the impedance network for providing a second electrical response to the sensing signal corresponding to the temperature in the well bore;

a plurality of pressure actuated switch means, each switch means for switching from a first condition to a second condition when pressure in the well bore reaches a selected level, the selected level for each switch means differing from the other switch means;

means for connecting each pressure actuated switch means into the electrical network and for altering the first electrical response of the electrical network when each pressure actuated switch means switches between said first condition and said second condition; and means at the surface for monitoring the sensing signal to determine in combination the first and second electrical responses of the electrical network and the temperature sensitive circuit means, the combined first and second electrical responses indicating which of the pressure actuated switch means have switched between said first condition and said second condition, for providing a simultaneous indication of the well bore pressure level and temperature.

3. In the submersible pump assembly of the type having an insulated power cable suspended in a well bore, providing AC power from the surface to an electrical motor in the well bore, an apparaus for monitoring the pressure in the well bore, comprising:

source means located at the surface electrically connected to the power cable for superimposing a DC sensing signal on the power cable;

a resistive network composed of a plurality of resistors having a cumulative resistance, located in the well bore and electrically connected to the power cable, for accepting the sensing signal;

a plurality of bistable, pressure-activated switches, each connected in parallel with one of the resistors of the resistive network, each switch being operable between a closed position providing a short circuit path for shunting said DC sensing signal around one of the resistors and an open position providing an open circuit around one of the resistors, each switch changing between said closed position and said open position when a selected pressure level is reached, thereby changing the cumulative resistance of the resistive network, each switch having a different pressure level for changing positions;

temperature sensitive circuit means electrically connected to the resistive network for providing a resistance that changes corresponding to the temperature in the well bore;

means at the surface for monitoring the sensing signal to determine the cumulative resistance of the resistive network and the temperature sensitive circuit means, which indicates which of the bistable, pressure-activated switches have changed position and also the resistance of the temperature sensitive circuit means, providing a simultaneous measure of the well bore pressure level and temperature.

4. In a submersible pump assembly of the type having a power cable with insulation, suspended in a well bore, providing AC power from the surface to an electrical motor in the well bore, an apparatus for monitoring the pressure in the well bore, comprising:

source means located at the surface electrically connected to the power cable for superimposing a DC sensing signal on the power cable;

uphole filter means for blocking the AC power from the source means and for passing the sensing signal to the power cable;

a resistive network composed of a plurality of resistors, located in the well bore and electrically connected to the power cable, the resistive network providing a cumulative resistance substantially independent of well bore temperature;

a plurality of bistable, pressure-activated switches, each connected in parallel with one of the resistors of the resistive network, each switch being normally closed providing short circuit path around one of the resistors for shunting said DC sensing signal around the resistor but which opens above a discrete pressure level and provides an open circuit around the resistor, each switch having a different threshold value for incrementally changing the cumulative resistance of the resistive network as the well bore pressure increases;

a temperature sensitive circuit element electrically connected to the resistive network for providing a resistance that changes corresponding to the temperature in the well bore;

downhole filter means for blocking the AC power from the resistive network and the temperature sensitive circuit element and for passing the sensing signal to the resistive network and the temperature sensitive circuit element;

means at the surface for monitoring the sensing signal to determine combined voltage drop across the resistive network and the temperature sensitive element, the combined voltage drop indicating which of the switches are open and also indicating the resistance of the temperature sensitive element, for providing a measure of the well bore pressure level and temperature; and means located downhole for blocking current from flowing through the resistive network and temperature sensitive element in the direction opposite the current of the sensing signal, for allowing a DC voltage to be applied at the surface of opposite polarity to the sensing signal for testing the insulation of the power cable.

5. In a submersible pump assembly of the type having an insulated power cable suspended in a well bore, providing AC power from the surface to an electrical motor in the well bore, an apparatus for monitoring the pressure in the well bore, and ambient temperature in the well bore, comprising:

source means located at the surface electrically connected to the power cable for superimposing a DC sensing signal on the power cable;

a plurality of series connected resistors, providing a combined resistance, connected to the power cable for receiving the sensing signal;

a plurality of bistable, pressure-activated switches, each connected in parallel with one of the resistors, each switch being operable between a first position providing a short circuit path for shunting said DC sensing signal around one of the resistors and a second position providing an open circuit around the resistor, each switch changing between said first and second positions at a selected pressure level, each switch having a different pressure level for changing between said first and second positions;

a temperature sensitive resistor, electrically connected to the resistors, of the type having a range of resistance that corresponds to the ambient temperature, the range of resistance not exceeding the resistance of any of the series connected resistors over an expected range of well bore temperatures, for providing a resistance to the sensing signal that changes corresponding to the temperature in the well bore; and means located at the surface for monitoring the combined resistance across the series connected resistors and the temperature sensitive resistor, which indicates which of the pressure switches have changed between said first position and said second position and also the resistance of the temperature sensitive resistor, providing a measure of the well bore pressure and temperature.

6. A method of monitoring the temperature and pressure in a well bore of the type having a submersible pump disposed therein, being energized by an insulated power cable suspended from the surface, comprising the method steps of:

providing an electric network in the well bore, having a cumulative resistance, electrically connected to the insulated power cable;

providing a plurality of pressure switches, each switch being of the type that moves between an open position and a closed position upon reaching a selected pressure level that differs from the levels of the other switches;

connecting the switches to the electrical network in a manner such that when each switch moves between said open and closed positions, the cumulative resistance of the electrical network will change;

providing a temperature sensitive circuit element in the well bore, connected with the electrical network which will provide a resistance corresponding to temperature in the well bore;

directing a sensing signal from the surface through the insulated conductor to the electrical network and temperature sensitive circuit element;

monitoring the sensing signal at the surface to determine the cumulative resistance of the electrical network and the temperature sensitive circuit element, which indicates the positions of the switches and the resistance of the temperature sensitive circuit element; and translating the cumulative resistance monitored into a simultaneous measure of the well bore pressure level and well bore temperature.

7. A method of monitoring the temperature and pressure in a well bore of the type having a submersible pump disposed therein, being energized by an insulated power cable suspended from the surface, said insulated power cable and submersible pump having a dielectric condition, comprising the method steps of:

providing a plurality of resistors in an electrical network in the well bore, electrically connected to the power cable;

providing a temperature sensitive resistor in the well bore, connected with the electrical network;

isolating the electrical network and temperature sensitive resistor from alternating current and from direct current having a first polarity but passing direct current of a second polarity;

connecting a pressure switch with each of the resistors of the electrical network, each switch being of the type that moves between a first position opening a path through one of the resistors and a second position closing the path through the resistor, each switch moving between the first and second positions upon reaching a selected pressure level that differs from the levels of the other switches;

routing a DC sensing signal of second polarity from the surface through the insulated conductor to the electrical network and temperature sensitive resistor to produce a cumulative voltage drop;

monitoring, at the surface, the cumulative voltage drop across the electrical network and the temperature sensitive resistor;

translating said voltage drop into a measure of the well bore pressure and well bore temperature; and applying a DC voltage having a first polarity to the insulated power cable for testing the dielectric condition of the insulated power cable and the submersible pump.

* * * * *